United States Patent [19]

Broillard

[11] 4,105,146
[45] Aug. 8, 1978

[54] METERING DISPENSER HAVING SUCK-BACK THROUGH NOZZLE

[76] Inventor: Bernard Broillard, Lieudit "Sur Avellard", Sevrier (Haute-Savoie), France

[21] Appl. No.: 725,893

[22] Filed: Sep. 22, 1976

[30] Foreign Application Priority Data

Sep. 26, 1975 [FR] France .................... 75 30277

[51] Int. Cl.² ............................................. B67D 5/40
[52] U.S. Cl. .................................... 222/383; 222/181
[58] Field of Search ............... 222/180, 181, 190, 372, 222/383, 385

[56] References Cited

U.S. PATENT DOCUMENTS

| | | | |
|---|---|---|---|
| 3,142,415 | 7/1964 | Louchheim | 222/383 X |
| 3,187,954 | 6/1965 | Hammer et al. | 222/383 X |
| 3,250,438 | 5/1966 | Packwood, Jr. | 222/181 |
| 3,319,835 | 5/1967 | Ensign et al. | 222/383 X |
| 3,540,630 | 11/1970 | Brown et al. | 222/181 X |

Primary Examiner—Robert B. Reeves
Assistant Examiner—David A. Scherbel
Attorney, Agent, or Firm—Remy J. VanOphem

[57] ABSTRACT

A metering dispenser for supplying a metered quantity of a viscous liquid comprising a reservoir for a metered quantity of liquid and a piston for expelling the liquid therefrom, first and second sealing rings around the piston preventing inlet of liquid to the reservoir during expulsion of the liquid from the reservoir by the piston and causing suction of any liquid remaining at the outlet back into the reservoir during the return stroke of the piston.

9 Claims, 11 Drawing Figures

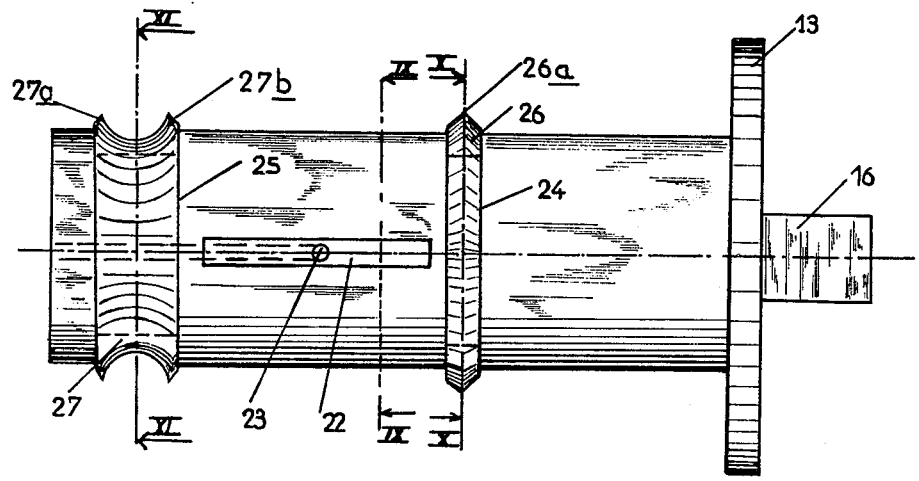
FIG 8
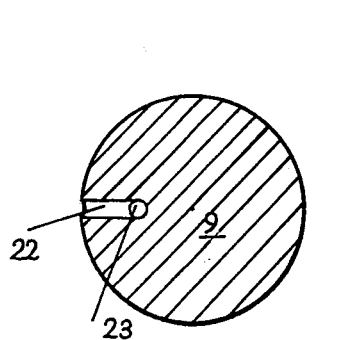   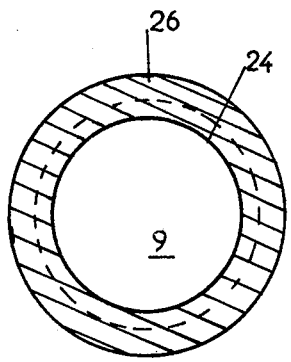   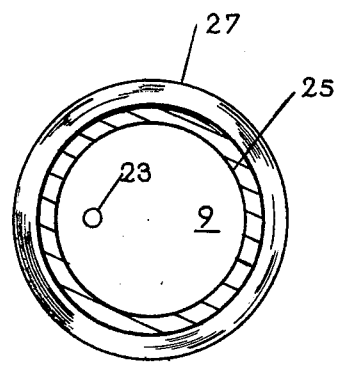
FIG 9   FIG 10   FIG 11

METERING DISPENSER HAVING SUCK-BACK THROUGH NOZZLE

Background of the Invention

1. Field of the Invention

The present invention relates to a dispenser intended to deliver a predetermined quantity of a liquid or viscous product. More particularly, it relates to improvements applied to the metering pump provided on a liquid soap dispenser for example.

2. Description of the Prior Art

It is known that a product of this type dries up quickly in the open air, thus forming a solid skin. Consequently, in conventional dispensers, the product remaining in the orifices dries and blocks up the orifices.

To eliminate this problem, air-tight dispensers have been produced provided with a pump having a cylindrical body, a slide member defining at least two chambers inside which the movement of the slide member alternately creates compression and reduced pressure allowing the suction of the product and cleaning of the ejection orifice. It has been found that if such metering devices are theoretically perfect, in fact they have numerous practical drawbacks. The sliding member and pump body, made from different materials, have different coefficients of expansion. The result of this is that the seal between the lateral walls of the slide member on the one hand and of the pump body on the other hand is uncertain, such that as it dries between the two walls, a film of product prevents the sliding of the slide member. In addition, the machining of the sliding piston must be very accurate, of the order of 1/100 of a millimeter, which makes the latter an expensive part.

The object of the present invention is to eliminate these problems and to produce a dispenser comprising a metering pump which improves the operating qualities whilst reducing the manufacturing cost

Summary of the Invention

A metering dispenser according to the invention, intended to be connected to the lower part of a container containing the product to be metered, which may be a liquid or viscous product, comprises a reservoir whose base comprises a housing, mounted in which is a metering pump constituted by a cylindrical body, sliding inside which is a slide member able to be subjected to two opposing effects, namely the effect of a push-bar pivotally mounted on the dispenser and the effect of return means which tends to extract the slide member from inside the body, whereas the slide member is in the form of a single piston provided at its rear end with a finger member connected to the push-bar and characterised in that a first peripheral groove is provided at the rear of an elongated opening provided in the lateral wall of the piston, parallel to its generatrix, a second peripheral groove being provided in the piston at the front of the elongated opening, whereas a flexible gasket is housed in each of the grooves and that an inlet orifice passes through the lateral wall of the body in order to open into a metering chamber between the front of the piston and the front end of the body, when the piston is inoperative, an outlet orifice passing through the wall of the body in order to open into the region located between the two lateral lips of the front gasket, in this inoperative position, the outer peripheral contour of which gasket comprises a concave section, whereas finally a channel connects the front metering chamber and the elongated opening provided on the same generatrix as the outlet orifice with which it may communicate.

According to another feature, whatever the position of the sliding piston, the front lip of the front gasket is always located in front of the outlet orifice, whereas the single lip of the rear gasket is always situated in a region located at the rear of the inlet and outlet orifices for the product such that whatever the position of the piston, the two flexible peripheral gaskets ensure a complete seal. This makes it possible to extend the manufacturing tolerances of the piston, which may slide with a certain clearance inside the cylindrical body. In this way, it will be seen that the manufacturing costs and the risks of jamming are reduced.

According to another feature, the inlet orifice is alternately open to the metering chamber and closed by the lateral wall of the piston located in front of the rear gasket during movement of the piston, whereas at the same time, the outlet orifice is alternately closed by the front gasket and open to the elongated opening provided in the piston.

According to another feature, the dimensions and arrangement of the metering chamber, of the elongated opening and of the orifices constitute, with the sliding of the piston, a device for producing suction, compression and a reduced pressure for the air and product to be dispensed. The sliding movement ensures cleaning of the orifices, whereas the two flexible gaskets guarantee the seal of the system.

Brief Description of the Drawings

The accompanying drawings, given as a non-limiting example, will make it easier to understand the features of the invention.

FIG. 8 is a detailed view of the piston and gaskets.

FIG. 9 is a section in the direction of arrows IX—IX (FIG. 8) in the region of the elongated opening in the piston.

FIG. 10 is a cross section in the direction of arrows X—X (FIG. 8) in the vicinity of the rear gasket.

FIG. 11 is a cross section in the direction of arrows XI—XI (FIG. 8) in the vicinity of the front gasket.

DESCRIPTION OF THE PREFERRED EMBODIMENT

Figures 1, 2:
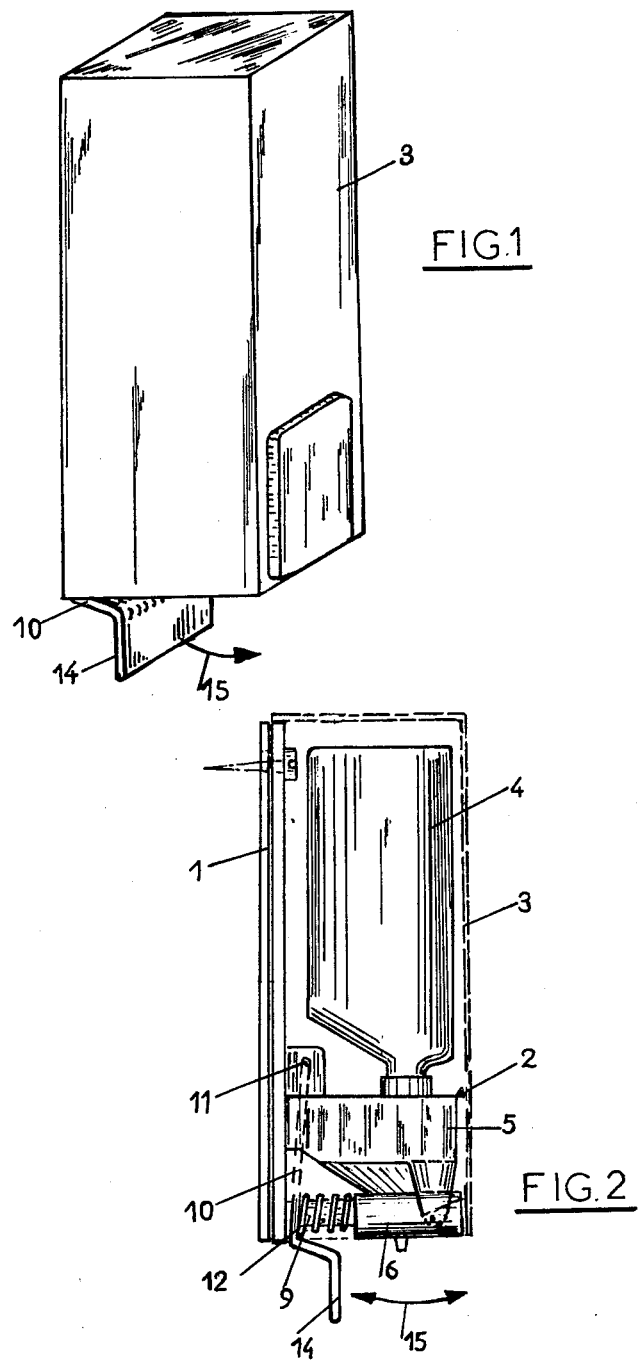
FIG. 1 is a general view of a metering dispenser according to the invention.
FIG. 2 is a side view of the apparatus in the inoperative position.
Figure 3:
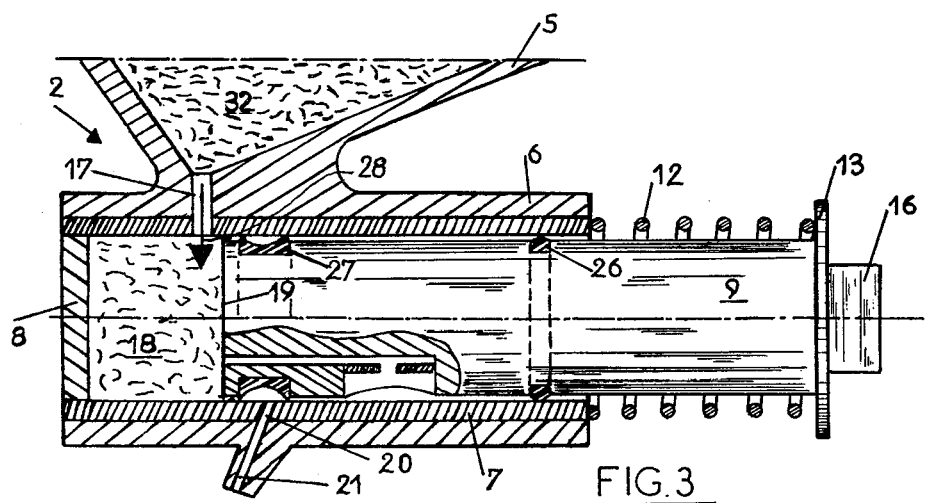
FIGS. 3 to 7 are longitudinal sectional views of the metering pump illustrating the operation of the dispenser according to the invention.

Referring to FIGS. 1 through 3, there is shown an apparatus comprising a support 1, fixed to the base of which is the dispenser 2. A casing 3 surrounds the dispenser 2 and a container 4 for the liquid or viscous product adjoining the reservoir 5 of the dispenser. The reservoir 5 is integral with the housing 6 of a pump which constitutes the metering member of the apparatus. The cylindrical body 7 of the pump is housed inside the member 6. The cylindrical chamber which it defines is closed on its front side 8 and open at the rear to facilitate the sliding of a piston 9 under the action of a push-bar 10 pivoted at its upper part 11. A helical spring 12 surrounds the rear of the piston, between a rear shoulder 13 and the rear edge of the pump body 7. In its lower part, the push-bar is bent forwards and comprises a handle 14 which enables it to pivot in the direction of the double arrow 15 and to act against the action of the spring 12 through the intermediary of the finger member 16. In FIGS. 3 to 7, the mechanical clearance between the lateral walls of the cylindrical body 7 and of the piston 9 has been accentuated. An inlet orifice 17 is provided in the lower part of the reservoir 5. It opens into a dispensing and metering chamber 18. This chamber, having a variable volume depending on the longitudinal position of the piston, is located in front of the pump between the base 8 of the cylindrical body and the front side 19 of the piston. An ejection orifice 20 leads towards the outside and the base of the pump through a channel 21 (FIG. 3).

The diameter of the sliding piston 9 is less than that of the cylindrical body 7. The following are cut in this piston:

a radial longitudinal groove 22;

a longitudinal chanel 23 connecting the groove 22 and the front side of the piston;

two peripheral grooves, the first 24 located at the rear and the second 25 located at the front of the radial groove 22 (FIG. 8).

Gaskets 26 and 27 made from a flexible material are housed in the grooves 24 and 25 respectively. They ensure liquid-tight sliding of the piston whilst facilitating a greater manufacturing tolerance (FIGS. 8 to 11). The first gasket 26 has a cylindrical contour with flattened surfaces comprising a lip 26a, solely the latter coming into contact with the inner wall of the cylindrical body. The seal obtained is better than with an annular gasket and friction is reduced. The second front gasket 27 has a completely different shape. Its outer contour of revolution comprises a concave section thus defining two lateral lips 27a and 27b. As will be seen during the operation of the apparatus, the two lips 27a and 27b ensure the front seal for the sliding movement. In particular, the front lip 27a never passes the ejection orifice 20.

Finally, the finger member 16 is rectangular for example. It constitutes the connection system between the push-bar and piston and the system for preventing the rotation of the piston such that the groove 22 remains on the same generatrix as the ejection orifice 20.

Operation

The operation is as follows:

The chamber 18 contains a metered quantity of product introduced by reduced pressure as described hereinafter. When a user wishes to receive a metered quantity of soap, he places his fingers behind the handle 14 of the push-bar 10. By pulling this handle towards him, he plunges the piston into the pump (FIG. 2, arrow 15). The soap contained in the chamber 18 is transferred to the groove 22 and discharged into the user's hand through the channel 21.

In the inoperative position (FIG. 3), the spring 12 maintains the piston 9 in its rear position. The inlet orifice 17 is open. The ejection orifice 20 opens out between the lips 27a and 27b of the front gasket 25. The product fills the chamber 18, whose volume is thus maximum (FIG. 3, arrow 28).

Figure 4:
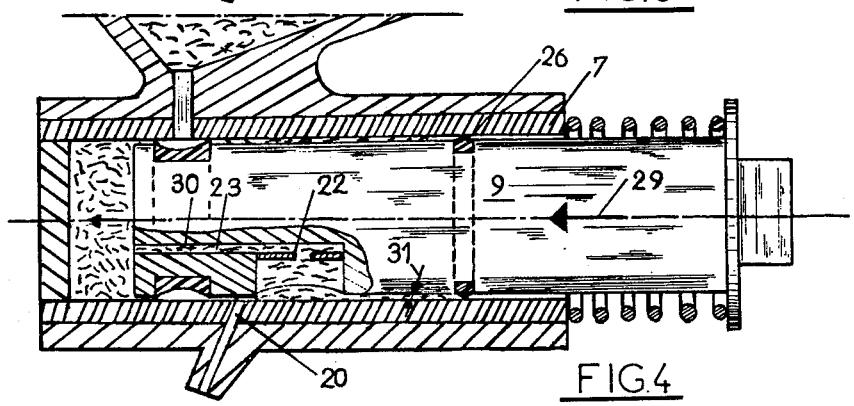

When the piston is depressed (FIG. 4, arrow 29), the volume of the chamber 18 decreases. The product is firstly driven back through the inlet orifice 17 until the front lip 27a of the gasket 27 closes off this orifice. The ejection orifice is still closed, either by the gasket, or by the piston and the product is forced back through the channel 23 into the radial groove 22 which constitutes a transfer chamber (arrow 30). If the mechanical clearance 31 between the lateral walls of the cylindrical body 7 and of the piston 9 is considerable, a small amount of product 32 may flow through the orifice 20 as soon as the latter is exposed by the rear lip 27b (FIG. 4).

Figure 5:
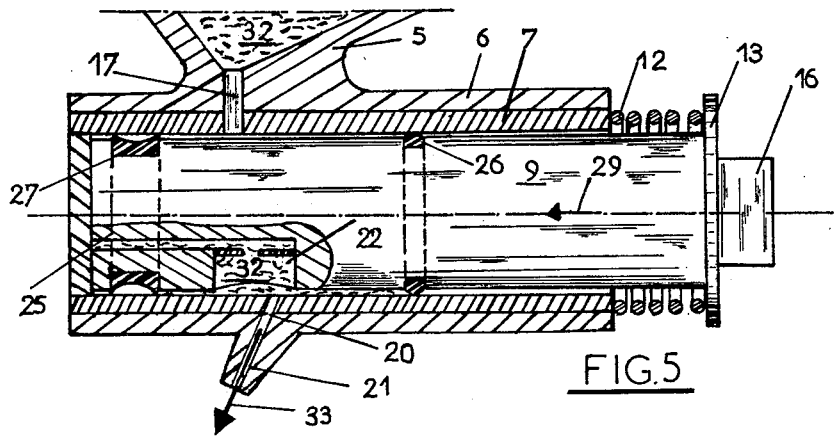
Figure 6:
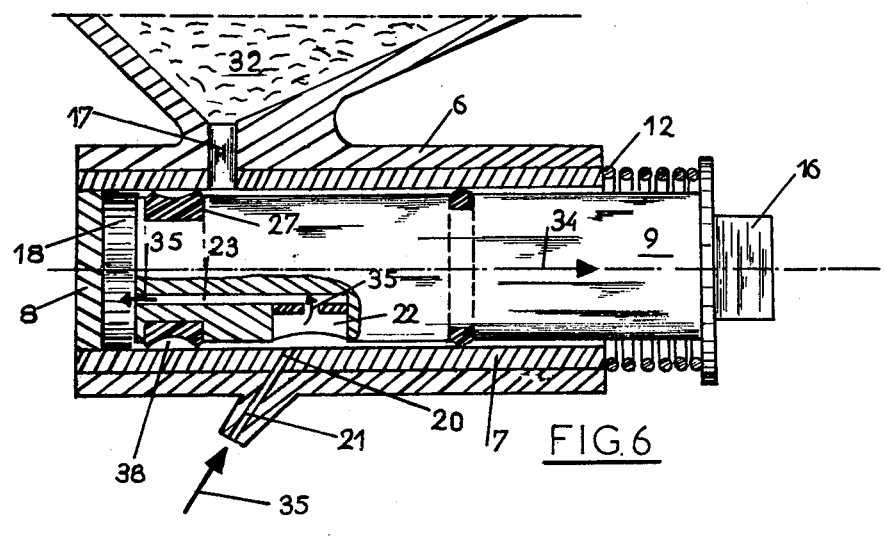

As the piston 9 continues to be pushed forwards, the chamber 22 thus comes into facing relationship with the ejection orifice 20 until the volume of the metering chamber 18 is reduced to zero (FIG. 5). The product is ejected in the direction of arrow 33 under the effect of the high compression produced by the reduction in volume in the chamber 18. At this time, the inlet orifice is closed by the region of the piston comprised between the two peripheral gaskets.

FIG. 5 shows that when the volume of the chamber 18 is zero, a certain quantity of product 32 may remain in the groove 22 and above all in the orifice and the ejection channel 20 and 21. When one begins to release the push-bar, the piston returns rearwards (arrow 34, FIG. 6). Whilst the volume of the chamber 18 increases, the concave gasket 25 prevents any intake of air between the lateral walls of the pump or the inlet of any product 32 through the orifice 17 which remains closed. The volume 18 under reduced pressure creates a strong suction of cleaning air through 21, 20, 22 and 23 (arrow 35). In fact, this path is the only one possible, since the seal between the lateral walls of the cylindrical body 7 and of the piston 9 is produced at the front and at the rear of the orifices 17 and 20 by the gaskets 27 and 26 axially integral with the piston 9 able to move under the effect of the spring 12 or push-bar acting on the rear finger member 16.

The air drawn through 21, 20, 22 and 23, when the piston returns to the inoperative position, cleans these passages in which particles of product could have dried. It will be noted that the volume of the groove 22 or transfer chamber, is substantially less than the volume achieved by the chamber 18 before the opening of the inlet orifice 17 to increase the suction and therefore cleaning effect.

Figure 7:
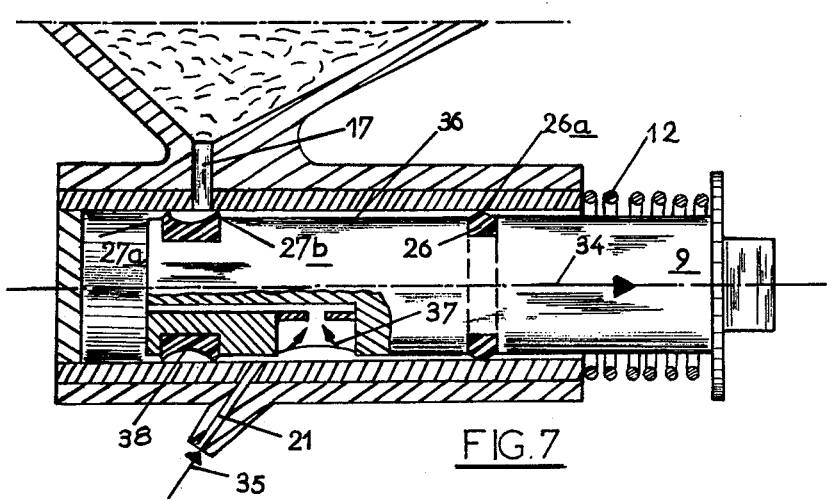

FIG. 7 shows a position of the piston corresponding to that illustrated in FIG. 4. The difference resides in the fact that a movement in the opposite direction is imparted to the piston under the action of the spring 12. The inlet opening 17 opens out between the two lips 27a and 27b of the front gasket. The outlet orifice 20 is closed by the lateral wall of the piston 9 comprised between the groove 22 and the gasket 27. As the volume of the chamber continues to increase, the depression is partly compensated for by a slight flow of air under high pressure through the orifice 20 (arrow 35) on the one hand and on the other hand by considerable suction of particles of product which could have lodged in the annular volume 36 existing between the inner wall of the pump body 7 and the lateral wall of the piston 9. The height of this annular ring 36 is defined by rear sealing lips 27b and 26a.

It will be noted that on all the drawings the dimensions of the clearance between the lateral sliding walls and the concavity of the front gasket 27 have been exaggerated to show the advantage of the present invention. In addition, the piston remains in the positions illustrated in FIGS. 4 and 7 for only a very short time. The pressure between the lips 27a and 27b of the front gasket 27 does not allow any descent of product 32 into the annular volume 38 limited by these lips.

As the piston continues to return to its inoperative position, the outlet orifice 20 is firstly closed by the rear lip 27b, the inlet orifice 17 being closed by the front lip 27a. The chamber 18, which is already under reduced pressure, continues to increase in volume whereas all its inlet orifices are closed. The pressure in the metering chamber 18 is decreased.

When the piston reaches its rear extreme position (pump in the inoperative position), the gasket 27 exposes the inlet orifice 17, its sealing lips being located on either side of the outlet orifice 20. Reduced pressure in the chamber 18 causes the suction (arrow 28) of a metered quantity of product 32 contained in the reservoir 5 of the dispenser. The quantity drawn in by suction is such that it counterbalances the reduced pressure prevailing in the chamber 18. The metering pump is thus in its initial position (FIG. 3).

Naturally, the embodiment illustrated in the drawings is given only as an example. In particular, the return spring 12, the push-bar and actuating finger member 16 may be replaced by any other device of known type which make it possible to use the metering dispenser with a single hand.

The main advantages of the invention are as follows:

easier machining of the piston (greater tolerance on the diameter which no longer ensures the sealing function);

automatic cleaning of the orifices for the inlet and ejection of the product;

decrease in friction during the reciprocating movement of the piston, since only the three peripheral lines formed by the lips of the gaskets slide along the cylindrical body;

when inoperative, the outlet orifice is positioned between the two lips of the concave gasket 27, such that the annular volume 38 facilitates aeration of the channel 21 and orifice 20 whilst maintaining the seal on either side of this orifice.

It should finally be noted that a preferred embodiment consists of providing the inlet orifice 17 in the lower part of the reservoir 5, whose lower walls may be slightly inclined. This construction makes it possible to prevent the product 32 from drying in the reservoir 5.

What is claimed is:

1. A metering dispenser for supplying a metered quantity of liquid comprising:

a housing having an inlet, an outlet and a cavity interposed said inlet and outlet;

a piston having a transfer chamber therein, said piston mounted in said cavity and cooperating with the cavity to define a metering chamber; said metering chamber communicating with said inlet and outlet;

first means for sealing said metering chamber, said sealing means mounted to said piston, said first sealing means being operable to terminate communication between said inlet, and outlet with said metering chamber;

a passage within said piston, said passage having one end communicating with said metering chamber and an opposite end terminating in said transfer chamber of the piston, said transfer chamber communicating with said outlet when said piston is in a first predetermined position;

means for terminating communication between said transfer chamber of the piston and said outlet;

second means for sealing mounted to said piston adjacent said transfer chamber, said transfer chamber interposed said first and second sealing means;

a reservoir complementary with said housing, said reservoir communicating with said inlet of said housing; and means for actuating said piston, said actuating means pivotally attached to said housing and said piston for moving said piston from a fully extended position to a fully retracted position, wherein, when said piston is in a fully extended position and a liquid fills said metering chamber by way of said inlet while said first sealing means seals said outlet and said piston is moved from said fully extended position to said fully retracted position, said first sealing means seals said inlet so that, said piston moves said liquid from said metering chamber through said passage and into said transfer chamber of the piston, said means for terminating communication between said transfer chamber and said outlet preventing said liquid from escaping through said outlet until said piston moves to said first predetermined position towards said fully retracted position, said transfer chamber communicating with said outlet to expel said liquid from said dispenser after said piston moves to said first predetermined position towards said fully retracted position, said transfer chamber expelling said liquid from said metering chamber, passage and transfer chamber, while said piston is moving to said fully retracted position, said transfer chamber further communicating with said outlet to draw in ambient air to expunge said outlet, passage and transfer chamber of any liquid remaining therein while said piston moves from a fully retracted position to said first predetermined position, said metering chamber developing a vacuum when said piston moves toward said fully retracted position past said first predetermined position, said vacuum aiding the filling of said metering chamber with liquid from the reservoir through said inlet after said first sealing means moves to unseal said inlet.

2. A metering dispenser as claimed in claim 1 wherein, said first sealing means comprises:

a first peripheral groove disposed in said piston;

a flexible seal ring mounted in said groove and cooperating with said cavity of said housing to seal said chamber, said seal ring having a concave upper surface with two outer lips, a substantially flat lower surface parallel to said concave upper surface and two side surfaces connecting said upper and lower surfaces; and means for mounting said flexible seal in said first peripheral groove.

3. The metering dispenser as claimed in claim 2 further comprising:

means for biasing said piston, said biasing means mounted to said piston for cooperation therewith, said biasing means opposing the movement of said piston such that when a push force moves said piston from a fully extended to a fully retracted position, said biasing means returning said piston to said fully extended piston upon removal of said push force.

4. The metering dispenser as claimed in claim 2 wherein, one of said two lips of said flexible seal is interposed said outlet and said inlet such that there cannot be any communication between said inlet and said outlet when said piston is in a fully extended position; and said second sealing means is interposed said outlet and said means for actuating said piston such that whatever the position of the piston, said flexible seal ring and said second sealing means insure a seal between the piston and the housing.

5. The metering dispenser as claimed in claim 2 wherein said inlet is closed by the side of the piston between said first and second sealing means such that, as the piston moves from a fully extended to a fully retracted position said liquid is expelled from said metering chamber through said passage to said transfer chamber.

6. The metering dispenser as claimed in claim 2 wherein, said piston terminates communication between said transfer chamber and said outlet when said piston is moved towards the fully retracted position to said predetermined position.

7. The metering dispenser as claimed in claim 2 wherein, the presure in said metering chamber is at a lower pressure than the ambient pressure after the piston has moved beyond said first predetermined position toward said fully extended position such that a vacuum in the metering chamber aids to draw the liquid into said metering chamber when said first sealing means permit communication between said inlet and said metering chamber.

8. The metering dispenser as claimed in claim 1 further comprising:
means for biasing said piston, said biasing means mounted to said piston for cooperation therewith, said biasing means opposing the movement of said piston such that when a push force moves said piston from a fully extended to a fully retracted position, said biasing means returning said piston to said fully extended position upon removal of said push force.

9. The metering dispenser as claimed in claim 1, further comprising:
a container mounted to said reservoir, said container being inclined and converging toward said inlet such that the liquid does not evaporate from the container.

* * * * *